June 2, 1970       R. N. BEFORE ET AL       3,515,261
CONVEYOR DISCHARGE MECHANISM
Filed April 19, 1968                3 Sheets-Sheet 1
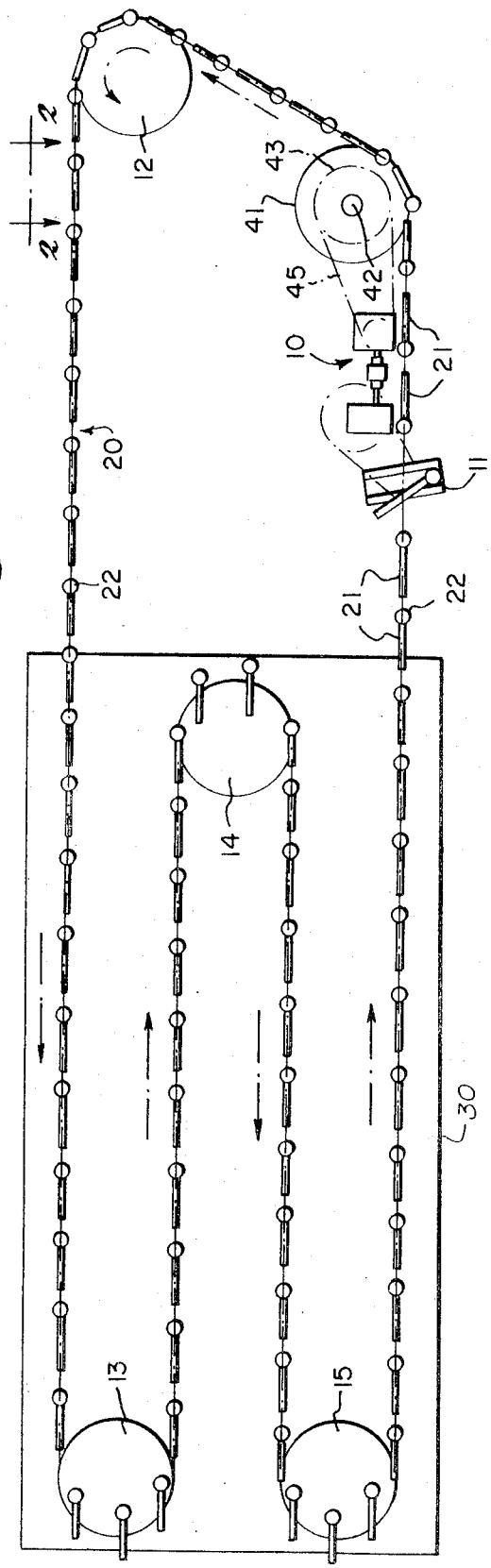
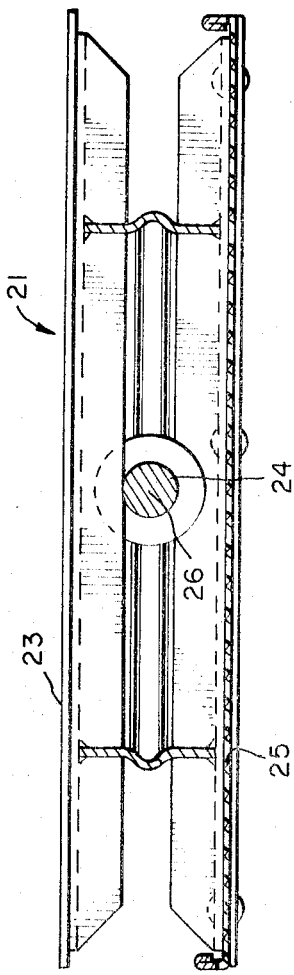
INVENTORS
Robert N. Before &
Donald T. Daniele
BY
KARL W. FLOCKS
ATTORNEY

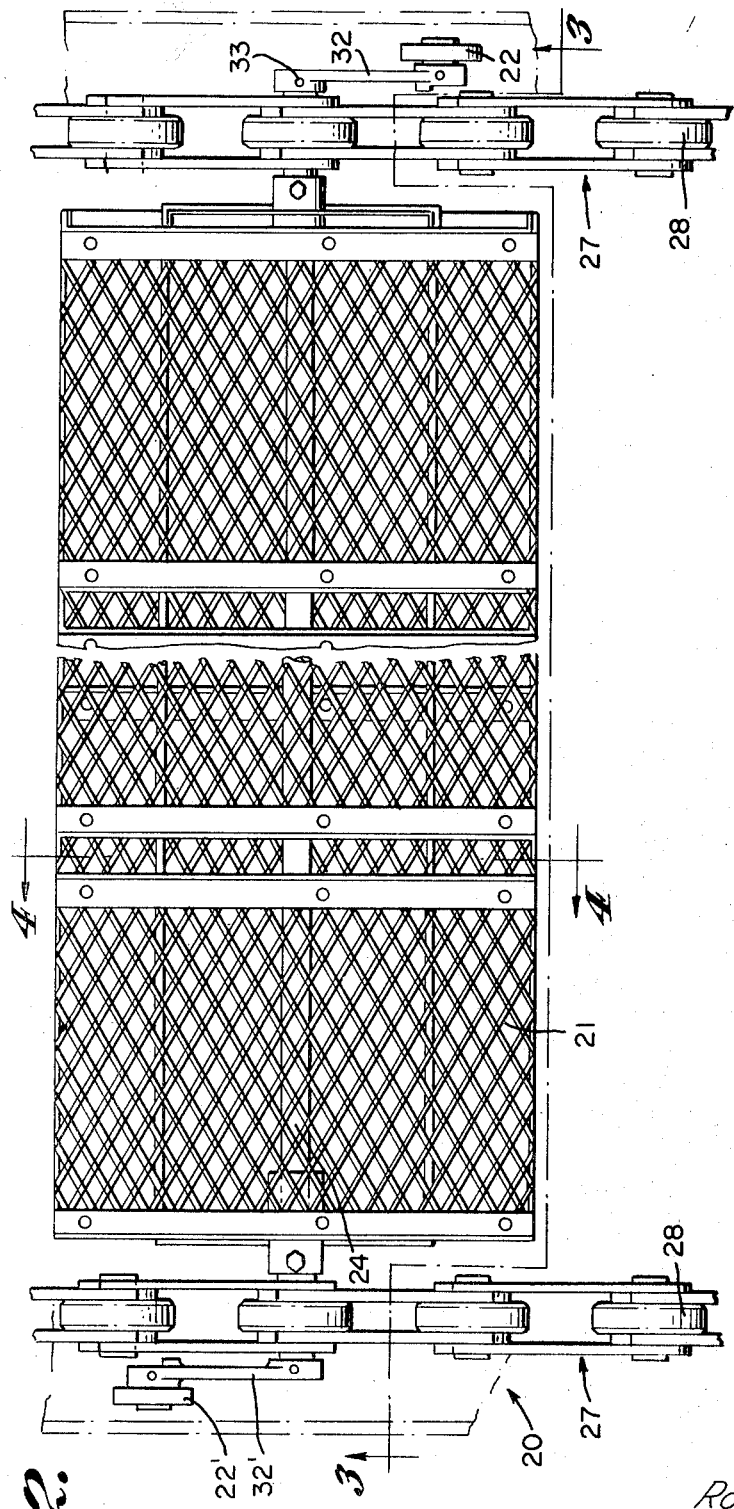
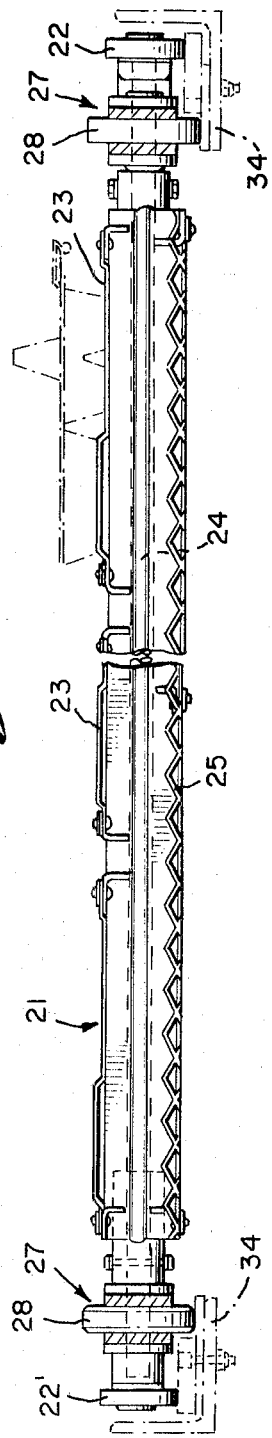

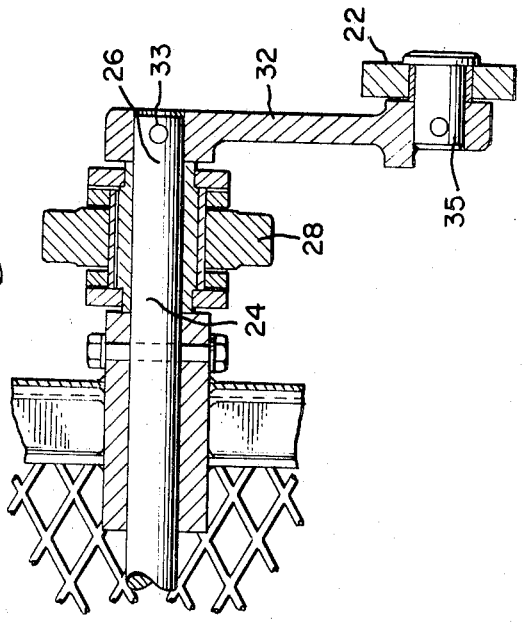
Fig. 5.
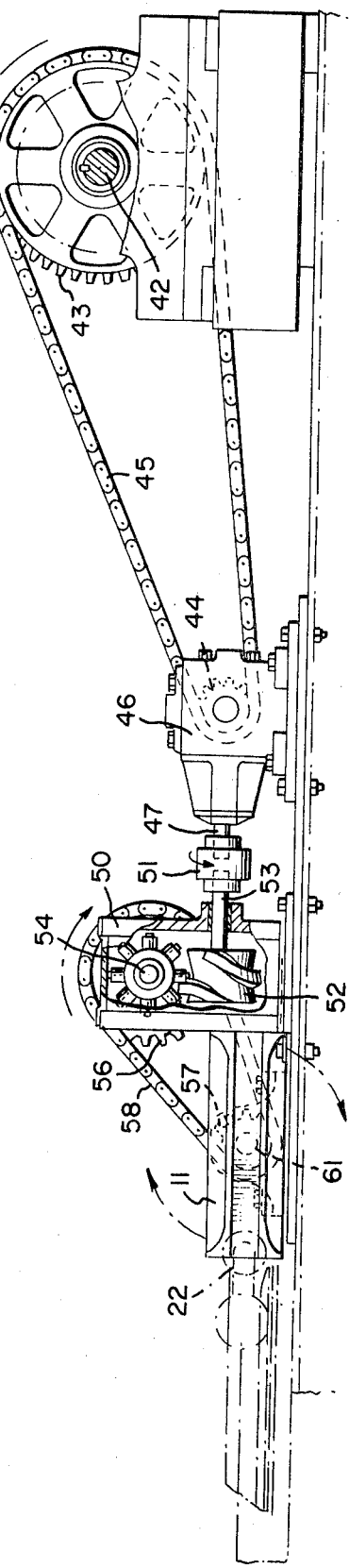
Fig. 6.
Fig. 7.
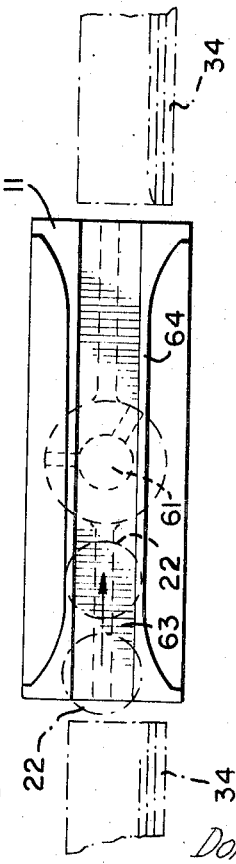
Fig. 8.
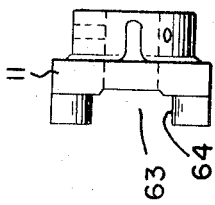
INVENTORS
Robert N. Before &
Donald T. Daniele
BY Karl W. Flocks
ATTORNEY 3,515,261
CONVEYOR DISCHARGE MECHANISM
Robert N. Before, Springfield, and Donald T. Daniele, East Longmeadow, Mass., assignors to Diamond International Corporation, New York, N.Y., a corporation of Delaware
Filed Apr. 19, 1968, Ser. No. 722,730
Int. Cl. B65g 17/00
U.S. Cl. 198—155          6 Claims

ABSTRACT OF THE DISCLOSURE

A mechanism operated in timed relationship with a conveyor having a keyway therein to receive a guide roller on a pivot arm attached to trays on the conveyor so as to turn each tray upside down as it passes the mechanism which rotates 180° during the passing of each tray. This mechanism is used in conjunction with a multiple pass dryer which positions the trays and their guide rollers for correct engagement with the discharge mechanism.

The present invention relates in general to a conveyor and more particularly to a discharge mechanism operated in conjunction with the conveyor.

BACKGROUND OF THE INVENTION

The general means of discharging a conveyor tray has been to tip it against a fixed stop as the conveyor chain carries the pivot point of the tray past the tipping means.

It is an object of the present invention to provide a positive, mechanical, timed means of discharging a product from a moving carrier. Specifically, the objective is to rotate a moving conveyor tray to cause the contents being carried to discharge or fall off of the conveyor tray.

SUMMARY OF THE INVENTION

In the present invention the conveyor tray is rotated about its pivot point. Advantageously the tipping means is driven in time with the conveyor system and effects a controlled positive discharge while maintaining a restraining mechanical connection to the carrier tray.

A further advantage of the present invention is its use in combination with a dryer conveyor system so as to allow positive and controlled rotation of the conveyor trays to an upside down position and positioning of these trays for operation with the discharge mechanism.

BRIEF DESCRIPTION OF THE DRAWINGS

The above and other objects and advantages of the invention will become apparent upon full consideration of the following detailed description and accompanying drawings in which:

FIG. 1 is an overall diagrammatic view of a multiple pass dryer with the discharge mechanism of the present invention used in conjunction therewith;

FIG. 2 is a plan view of the tray and chain connection of the conveyor system of FIG. 1;

FIG. 3 is a section view across the length of a tray between supporting chains along line 3—3 of FIG. 2;

FIG. 4 is an enlarged section view across the width of a tray along line 4—4 of FIG. 2;

FIG. 5 is an enlarged section drawing through the center of an arm and roller attached to a tray;

FIG. 6 is an enlarged detailed view of the portions of FIG. 1 showing the drive to the turnover track of the discharge mechanism;

FIG. 7 is an enlarged view of the turnover track portion of FIG. 6; and

FIG. 8 is a side elevational view of the turnover track of FIG. 7.

DESCRIPTION OF THE PREFERRED EMBODIMENTS

Considering now the details of an embodiment of the present invention, there is shown in FIG. 1 in diagrammatic form an overall view of a multiple pass dryer used in conjunction with a discharge mechanism 10. Specifically, this system is of the "multiple pass" type where a tray 21 is held in a horizontal attitude as the conveyor 20 carries it on several runs through a dryer 30. From the time the tray 21 enters the dryer 30 until it leaves, it maintains the same surface facing upward and its guide roller 22 or 22' in the same relative position, i.e. forward or rearward of the tray 21.

The tray 21, which may be of a type as illustrated in FIGS. 2, 3 and 4 has surfaces 23 for supporting egg cartons to be dried thereon and has a center shaft 24 supportingly connected to the tray surfaces 23 and 25 and located at a center pivot point 26 of the tray 21. The shaft 24 is connected on each of its ends to a chain 27 having rollers 28 of the hollow pin type whereby the shaft 24 passes through the hollow center of the rollers 28. On the extreme ends of each of the shafts 24 there is connected an arm 32 and 32' which is pinned to the shaft 24 by a pin 33 so that the shaft 24 may be rotated by movement of the arm 32 or 32'. A guide roller 22 or 22' is connected on the opposite end of the arm 32 or 32' from its connection to the shaft 24. The rollers 28 of the chain 27 forming the conveyor 20 are of a smooth roller type so that they and the guide rollers 22, 22' may move along a track 34 while the track 34 acts as a positive guide to maintain the attitude of the trays 21 during their runs through the dryer 30 and at all times except during the turnover operation.

As seen in the sectioned view of FIG. 5, a raising or lowering of the guide roller 22, which is rotatably mounted on a pin 35, will cause the raising and lowering of the end of the arm 32 attached to that roller. This action causes the rotation of the arm 32 about the shaft 24 to which it is pinned by pin 33, thereby causing the rotation of the shaft 24. The rotation of the shaft 24 causes a rotation of the tray 21 around the shaft 24, which shaft is considered as containing the center pivot point 26 of rotation of the tray 21.

For proper support of the trays 21 by means of the shaft 24, the chain 27 having rollers 28, supports the shaft 24 on both sides of the tray 21. Although an arm and guide roller is shown attached to both ends of the shaft 24, the operation of the discharge mechanism 10 illustrated herein is possible with only one arm 32 and guide roller 22 attached on one side of the shaft 24. But the preferred embodiment would use both arms 32 and 32' for greater stability arranged so that relative to the direction of travel one arm 32 is leading and the second arm 32' is trailing. This condition gives greater assurance that the tray 21 is guided and cannot pivot about the shaft 24 because rollers 22 and 22' are opposing the rotating action in both directions through their contact with the track 34. This is a type of conveyor system for which the present discharge mechanism 10 can be used to "turn-over" the tray 21 while chains 27 continue to drive the pivotal shaft 24 with the tray 21 mounted thereon, in a continuous manner.

This form of conveyor system is used merely as an illustrative example to explain the invention and it should be understood that there are many other types of conveyor systems which may be used with the discharge mechanism 10 to form the present invention.

FIG. 6 illustrate in greater detail an enlarged portion of the drive to the turnover track 11 which itself is shown in an enlarged detail view in FIGS. 7 and 8.

An idler sprocket 41, shown in FIG. 1, driven by the conveyor chain 27 drives a shaft 42 upon which it is mounted in time with the conveyor system. Also mounted on the shaft 42 is a sprocket 43 driving the sprocket 44 through the chain 45. Sprocket 44 drives a commercial right angle drive 46 having a 1:1 ratio. The output to the shaft 47 of the drive 46 is connected to an indexing unit 50 by a coupling 51.

The indexing unit 50 may use a commercially available indexing mechanism wherein a constant input to the cam 52 through input shaft 53 results in an intermittent output to output shaft 54 consisting of an index motion and a dwell. A unit that may be used which is commercially available is a standard four position unit that results in 90° rotation of the output shaft 54 for each revolution of the input or cam shaft 53. 180° of the input period results in a 90° index of the output shaft 54. The remaining 180° input period produces a dwell of the output shaft 54.

On the output shaft 54 of the indexing unit 50 there is mounted a procket 56 which drives sprocket 57 through chain 58. The ratio of sprockets 56 and 57 is 2:1 resulting in 180° rotation of shaft 61 for each 90° indexing of the output shaft 54 in the indexing unit 50. Fixed to the end of the shaft 61 is turnover track 11 shown in enlarged detail in FIGS. 7 and 8.

The drive means thus shown in FIG. 6 provides the turnover track 11 with 180° rotation and a dwell. Rotation or indexing takes place in one half the cycle time, and dwell takes place during the remaining half of the cycle time. In this regard cycle time is understood to mean the time required for one tray 21 to advance one tray pitch. In the particular tray and chain combination illustrated in FIG. 2, one tray pitch of the conveyor 20 equals three chain pitches.

The turnover track 11 illustrated in FIGS. 7 and 8 is mounted on shaft 61 so that it may rotate about the shaft 61 as its center point. The turnover track 11 has a keyway 63 which has a lower surface 64 substantially level with the track 34 when the turnover track 11 is in a horizontal position. This enables the guide roller 22 to move from its position along the track 34 directly through the keyway 63 and upon leaving the keyway 63 to pass back onto a continuation of the track 34.

The operation of the turnover track 11 in conjunction with the chain 27 and trays 21 is as follows. Starting with the turnover track 11 in a dwell position and aligned with the track 34 as shown in FIGS. 6 and 7 the chain 27 drives the tray 21 toward the turnover track 11. The roller 22 on arm 32 runs off the track 34 into the keyway 63 of the turnover track 11 and continues to run along the keyway 63 to a point approximately at the center of shaft 61. When the roller 22 reaches this point on the track 34, the turnover track 11 begins to rotate through 180° as a result of the drive already described in connection with FIG. 6. The rotation of track 11 forces the roller 22 and arm 32 to rotate about the center 26 of the shaft 24, causing the tray 21 to rotate about the same center 26. The shaft 24 rotates in the hollow bushings in chain 27. Arm 32 and roller 22 continue to rotate due to the indexing of the track 11, until the track 11 completes its rotation due to indexing and returns to a dwell position with the upper and lower walls of the keyway 63 parallel to the track 34. Roller 22 now becomes the trailing roller since the tray 21 is now in an upside down position. Any product on the tray 21 must fall off during this rotation of the tray 21 and thereby pass into a hopper, chute, or onto another conveyor.

The roller 22 is dragged out of the keyway 63 of the turnover track 11 onto conveyor track 34 while the turnover track 11 is beginning its dwell. The roller 22 which was previously leading when it entered the track 11 now leaves as the trailing roller.

The conveyor tray 21 thus has been rotated to discharge the product thereon in a controlled precise exact motion while always being mechanically held and never in a free or unrestrained condition. The tray 21 is always guided by the conveyor track 34 or the turnover track 11 and cannot rotate or assume any position other than a flat horizontal position until rotated deliberately by the turnover track 11.

The tray 21 continues its progress along the conveyor system around the end sprockets 41 and 12 from the lower level to the upper level of the conveyor system. In passing around sprockets in the system of which sprockets 13, 14 and 15 are in the dryer 30, the guide roller 22 which contacted the keyway 63 of track 11 changes from trailing to leading position by the time it again reaches the turnover track 11. It is then correctly positioned for operation with the discharge mechanism 10.

Other devices than that shown could be used to cause rotation and dwell of the turnover track 11. Gears, motors and clutches, etc. could be substituted for the drive shown in FIG. 6. The preferred embodiment has illustrated the drive shown because of its simplicity and extreme reliability at high speeds.

In addition to the advantages previously discussed with the present invention, dynamically no stresses, or shocks or external forces are developed to be transmitted back to the chain and subsequently to the main conveyor drive. This allows further smoothness and reliability in operation.

It will be obvious to those skilled in the art that various changes may be made without departing from the scope of the invention and that the invention is not to be considered limited to what is shown in the drawings and described in the specification.

What is claimed is:

1. A conveyor discharge mechanism comprising:
    conveyor means having guide means attached thereto,
        said conveyor means including
            supporting shaft means extending transversely of said conveyor means,
            tray means attached to said supporting shaft means for rotation with said supporting shaft means,
        said guide means including
            supporting track means extending longitudinally of said conveyor means,
            rotatable track means substantially aligned with said supporting track means and including a track section,
            a roller means connected to said tray means and located for movement in said supporting and rotatable track means at a position offset longitudinally from said supporting shaft means,
    rotating means connected to said track section to rotate said track section substantially about its center point to invert it with said roller means in said track section and invert said tray means during its passage thereby to discharge the load on the conveyor.

2. The conveyor discharge mechanism of claim 1, further characterized by
    said supporting shaft means substantially passing through a center point of said tray means.

3. The conveyor discharge mechanism of claim 2, further characterized by
    an arm extending substantially radially of and connected to said supporting shaft means at one of its ends and to said roller means at its other end thereby effecting the connection of said roller means to said tray means.

4. The conveyor discharge mechanism of claim 3, further characterized by
    a second arm having a second roller means attached thereto at one of its ends and at its other end attached to the opposite end of said supporting shaft means from said first mentioned arm and extending radially from said shaft means at substantially 180° from the extension of said first mentioned arm, and a second supporting track means to support said second roller means during a portion of the travel of said conveyor means.

5. The conveyor discharge mechanism of claim 1, further characterized by
said rotating means timed for operation in conjunction with movement of said conveyor means.

6. The conveyor discharge mechanism of claim 1, further characterized by
gear means connected to rotate said rotatable track means with periodic 180° movements of said track section with each 180° movement preceded by a dwell period.

References Cited

UNITED STATES PATENTS

| 2,121,365 | 6/1938 | Pardee | 198—147 X |
| 2,936,875 | 5/1960 | Von Kritter et al. | 198—147 X |
| 3,067,859 | 12/1962 | Jacobsen | 198—145 X |

FOREIGN PATENTS

| 531,070 | 10/1956 | Canada. |
| 16,507 | 9/1955 | Germany. |

EVON C. BLUNK, Primary Examiner

D. D. WATTS, Assistant Examiner

U.S. Cl. X.R.

198—138